United States Patent [19]

Clark

[11] Patent Number: 4,525,995
[45] Date of Patent: Jul. 2, 1985

[54] OIL SCAVENING SYSTEM FOR GAS TURBINE ENGINE

[75] Inventor: Ralph J. Clark, Rochester, Mich.

[73] Assignee: Williams International Corporation, Walled Lake, Mich.

[21] Appl. No.: 481,719

[22] Filed: Apr. 4, 1983

[51] Int. Cl.³ .............................................. F02C 7/06
[52] U.S. Cl. .................................. 60/39.08; 184/6.11; 184/6.12
[58] Field of Search ............................ 60/39.08, 39.33; 184/6.11, 6.12; 415/175, 176; 74/DIG. 5

[56] References Cited

U.S. PATENT DOCUMENTS

| | | | |
|---|---|---|---|
| 2,929,663 | 3/1960 | Hoeltje | 184/6.11 X |
| 2,975,864 | 3/1961 | Stoffert | 184/6.12 |
| 3,121,474 | 2/1964 | Matt | 184/6.12 |
| 3,135,353 | 6/1964 | Orsini | 184/6.12 |
| 3,170,292 | 2/1965 | Howes et al. | 60/39.08 |
| 3,378,104 | 4/1968 | Venable | 60/39.08 X |
| 3,382,670 | 5/1968 | Venable | 184/6.11 |
| 3,520,632 | 7/1970 | Brunkhardt et al. | 60/39.08 |
| 3,853,432 | 12/1974 | Cronstedt | 60/39.08 X |
| 4,018,097 | 4/1977 | Ross | 184/6.12 X |
| 4,068,740 | 1/1978 | Quinn et al. | 184/6.12 |

Primary Examiner—Louis J. Casaregola
Assistant Examiner—Donald E. Stout
Attorney, Agent, or Firm—Lyman R. Lyon

[57] ABSTRACT

A gas turbine engine intended for airborne applications in which several of the main bearings of the engine are contained in a bearing cavity and oil is scavenged from this cavity by allowing air from the high pressure region of the engine to leak into the cavity and then flow downwardly, together with entrained scavenge oil from the cavity, through an oversized cored passage housing a quill shaft driving the accessory gearbox for delivery to a crude separator at the bottom of the gearbox where the air is discharged to a low pressure region of the engine and the deaerated oil is delivered to the inlet of the scavenge pump. The leakage air flow effectively scavenges oil from the bearing cavity in all attitudes of the engine and also induces a flow of scavenge oil from the gearbox during upright operation. The gearbox also includes a cored passage which opens at its lower end in the separator and has its upper end arranged tangentially with respect to the topmost gear in the gearbox so that, during inverted operation of the engine, the topmost gear functions as a slinger to force scavenge oil from the gearbox to flow upwardly through the gearbox passage for delivery to the separator and thence to the scavenge pump.

2 Claims, 5 Drawing Figures

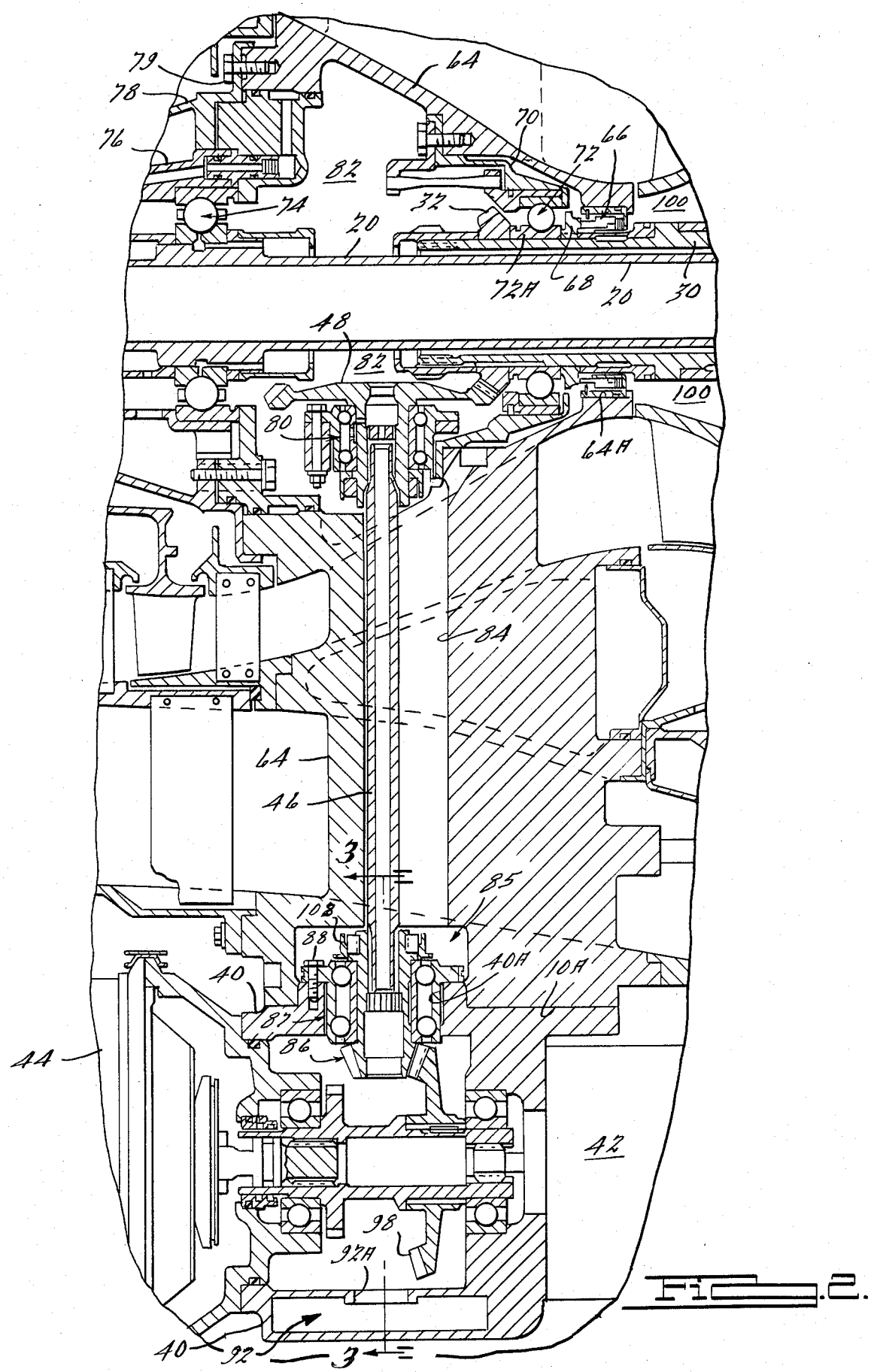

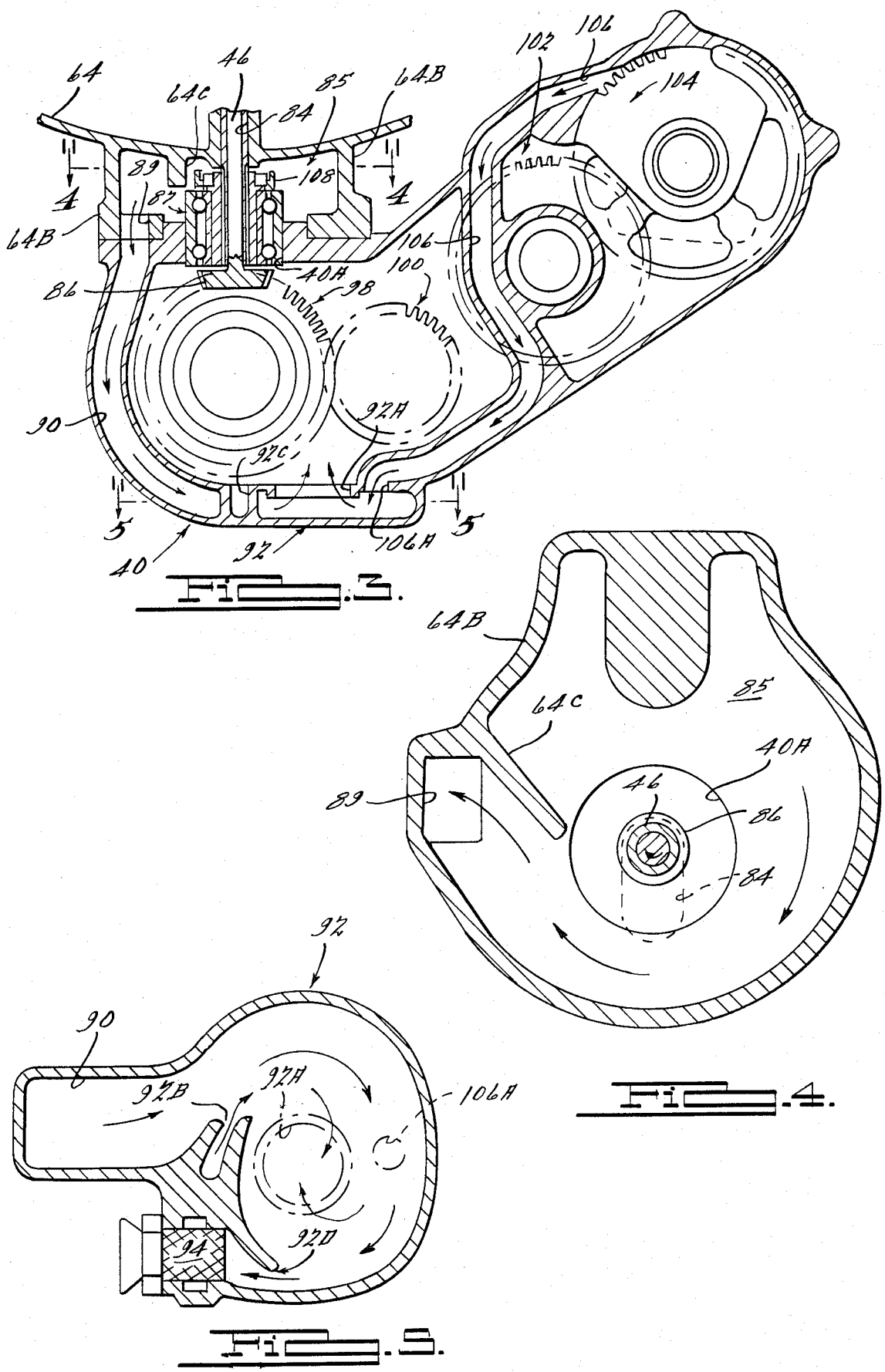

OIL SCAVENING SYSTEM FOR GAS TURBINE ENGINE

BACKGROUND OF THE INVENTION

This invention relates to gas turbine engines and more particularly to lubrication systems for gas turbine engines. Lubrication is very critical in a gas turbine engine because of the high rotational speeds and high temperatures involved. Because of these critical lubrication requirements, it is customary to provide positive lubrications systems, wherein lubricating oil is delivered positively to the various bearing and gearing locations and the used oil is positively scavenged from these locations to provide a continuous and positive flow of oil for lubricating and cooling purposes. The lubricating requirements are further compounded for engines which are intended for airborne applications since additional provision must then be made for positive lubricating and scavenging flow in both normal and inverted flight.

SUMMARY OF THE INVENTION

The present invention provides a lubricating system for a gas turbine engine which functions in a simple and effective manner to provide positive scavenging of lubricant from all critical engine locations and in all attitudes of the engine.

According to the invention, passage means interconnect a bearing cavity of the engine and the inlet of the scavenge pump, the bearing cavity is separated from a high pressure region of the engine by a lubricant seal which allows a leakage airflow into the bearing cavity in response to a pressure differential across the seal, and vent means are provided in the passage means adjacent the inlet of the scavenge pump venting the passage means to a low pressure region of the engine. Air is thus induced to continuously leak into the bearing cavity from the high pressure region and air and entrained scavenge oil are induced to flow through the passage means to the inlet of the scavenge pump where a separator is provided to vent the air to the low pressure engine region and deliver the oil to the inlet of the scavenge pump. This arrangement provides positive scavenging of the bearing cavity in any attitude of the engine.

According to a further feature of the invention, the separator is provided in the bottom of an accessory gearbox positioned at the bottom of the engine and the air and oil mixture flowing from the bearing cavity through the passage means induces a flow of scavenge oil from the gearbox.

According to yet another feature of the invention, a passage is provided in the accessory gearbox extending from the separator to a location adjacent the periphery of the topmost gear in the gearbox and the inlet of this passage is disposed tangentially with respect to the periphery of the topmost gear so that, as the gear rotates during inverted flight of the engine, the gear acts as a slinger to force scavenge oil from the gearbox to flow upwardly through the passage for delivery to the separator.

BRIEF DESCRIPTION OF THE DRAWINGS

FIG. 2 is a view on an enlarged scale of the portion of the engine within the circle 2 of FIG. 1 showing the oil scavenging system of the invention;

FIG. 3 is a cross-sectional view taken on line 3—3 of FIG. 2 with certain elements moved out of their actual plane for purposes of clarity; and FIGS. 4 and 5 are cross-sectional views taken on lines 4—4 and 5—5, respectively, of FIG. 3.

DETAILED DESCRIPTION OF THE PREFERRED EMBODIMENT OF THE INVENTION

Figure 1:
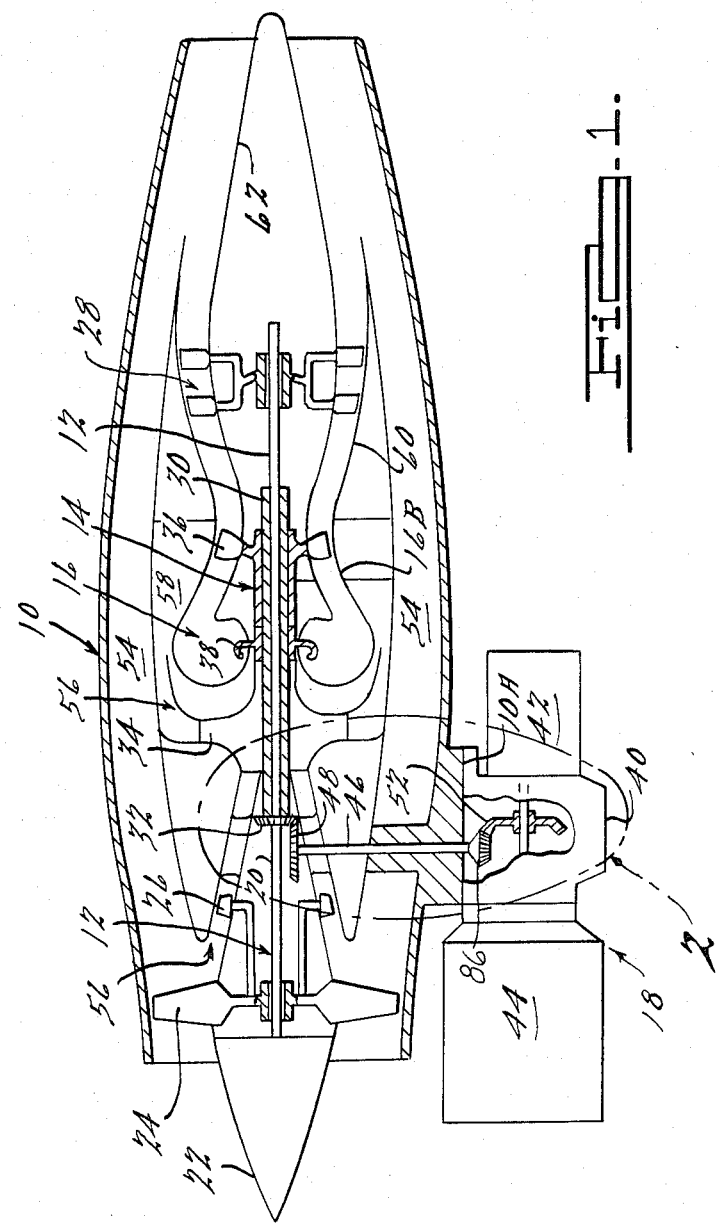
FIG. 1 is a somewhat schematic view of a medium bypass gas turbine engine suitable for use with the oil scavenging system of the invention.

The medium bypass gas turbine engine seen schematically in FIG. 1 includes a housing or nacelle 10, a low pressure spool assembly seen generally at 12, a high pressure spool assembly seen generally at 14, a burner seen generally at 16, and an accessory drive assembly seen generally at 18.

Low pressure spool assembly 12 includes a central quill shaft 20, a nose cone or spinner 22 secured to the forward end of shaft 20, a fan 24 carried on shaft 20 immediately aft of spinner 22, an intermediate pressure axial compressor 26 carried by fan 24, and a two-stage axial turbine assembly 28 carried on the aft end of shaft 20.

High pressure spool assembly 14 includes a quill shaft 30 telescopically received over shaft 20, a bevel gear 32 carried on the forward end of shaft 30, a single stage high pressure centrifugal compresser 34 carried by shaft 30 aft of gear 32, a high pressure turbine 36 carried on shaft 30 adjacent its aft end and a slinger 38 carried on shaft 30 between compressor 34 and turbine 36.

Burner 16 is annular and surrounds shaft 30 in a position between compressor 34 and turbine 36. Burner 16 has a generally kidney-shaped configuration and includes an annular opening through which slinger 38 projects for fuel injection purposes.

Accessory drive assembly 18 includes a gearbox 40 secured to a bottom mounting face 10A of nacelle 10, a pump assembly 42 secured to an aft mounting face of gearbox 40 and a starter generator 44 secured to a forward mounting face of gearbox 40. Accessory drive assembly 18 is driven by high pressure spool 14 via an accessory quill shaft 46 carrying a bevel gear 48 at its upper end engaging bevel gear 32 and carrying a bevel gear 86 at its lower end engaging a bevel gear 98 in gearbox 40.

The majority of air entering nacelle 10 and traversing fan 24 enters and flows through an annular bypass duct 54. However, a minor portion of the entering air, constituting a working airstream, enters an annular passage 56. The working airstream flowing through passage 56 traverses intermediate pressure compressor 26 and enters the inlet of high pressure centrifugal compressor 34. After traversing compressor 34, the airstream flows through a diffuser 56 into an expansion chamber 58 from where it enters the interior of combustor 16 through suitable holes to support combustion within the combustor. The heated airstream leaves the combustor through annular exit section 16B and drivingly impinges on turbine 36. The airstream leaving turbine 36 traverses a duct assembly 60 and drivingly impinges two-stage turbine assembly 28. The working airstream thereafter exits the engine through a duct 62 for mixture with the bypass airstream to provide forward engine thrust.

Further details of the medium bypass turbine engine shown schematically in FIG. 1 are disclosed in U.S.

patent application Ser. No. 489,530, filed Apr. 28, 1983, and assigned to the assignee of this application.

The novel oil scavenging system of the invention will now be described with reference to FIGS. 2-5.

Housing 10 includes an interstage member 64 formed as a casting. A carbon face seal assembly 66 is supported on an internal annular surface 64A of interstage member 64 and sealingly coacts with a face seal runner 68 on shaft 30. An annular bracket 70 secured to interstage member 64 carries a ball bearing 72 whose inner race is positioned on shaft 30 between bevel gear 32 and face seal runner 68. Another ball bearing 74 journals shaft 20. Bearing 74 is carried by an annular tapered bearing housing member 76 which in turn is carried by an annular tapered bearing support member 78 secured by screw bolts 79 to interstage member 64. A double-row bearing 80 journals bevel gear 48. Bearings 72, 74 and 80, as well as another roller bearing (not seen) journaling the forward end of shaft 20, are disposed in a bearing cavity 82 which is sealed at its aft end by seal assembly 66 and at its forward end by another carbon face seal assembly (not seen).

Accessory quill shaft 46 passes downwardly through interstage member 64 in a vertical cored passage 84 which is oversize in a fore and aft direction with respect to shaft 46. Passage 84 opens at its upper end in cavity 82 and at its lower end in a scroll-shaped cavity 85 formed in a lower end portion 64B of interstage member 64. Bevel gear 86 secured to the lower end of shaft 46, is journaled in a ball bearing 87. Bearing 87 is seated in a cored opening 40A in the upper wall of gearbox 40 and held in position by screw bolts 88. Cavity 85 communicates with a vertical cored passage 89 in interstage member lower end portion 64B which is vertically aligned with a downwardly and arcuately extending cored passage 90 in gearbox 40. Passage 90 opens at its lower end in a crude centrifugal air/oil separator 92 formed integrally in the bottom of gear box 40. Separator 92 has a generally circular configuration and includes a circular central hole 92A which opens into the interior of gearbox 40 which is vented by vent means, not shown, to bypass duct 54. Separator 92 further includes a nozzle 92B, formed at the exit of a cored passage 92C opening in gearbox 40, and a scavenge pump inlet 92D. A scavenge pump inlet screen 94 is positioned in scavenge pump inlet 92D.

Gearbox 40 includes a plurality of gears driven from bevel gear 86 and arranged to drive the various accessory items associated with the engine. Specifically, bevel gear 86 has meshing engagement with bevel gear 98 which in turn is drivingly arranged, in known manner, with other gears 100, 102 and 104 suitably positioned and journaled within gearbox 40. A cored serpentine passage 106 in gearbox 40 opens at its lower end 106A in separator 92 and has its upper end tangentially arranged with respect to the periphery of the topmost gear 104 in the gearbox.

In operation, lubricating and cooling oil is continuously and positively supplied to bearing cavity 82 and gearbox 40. Since the only escape route for either air or oil from cavity 82 is through passages 84, 85, 89, 90 and since the lower end of passage 90 is vented to the low pressure bypass duct 54 through hole 92A in separator 92, a significant pressure differential is maintained across face seal assembly 66. As a result, high pressure air in engine high pressure region 100 continuously leaks past seal 66 and into bearing cavity 82 from whence it moves downwardly in passage 84 together with entrained or scavenged oil from cavity 82. As the air/oil mixture exits the lower end of passage 84, it enters scroll-shaped cavity 85. Cavity 85 is designed to utilize the rotation imparted to the air/oil mixture by a slinger or pump member 108 on the top end of gear 86 to drive the air/oil mixture down passages 89 and 90 and discharge it tangentially into separator 92. A baffle or partition 64C, formed integrally with interstage member lower end portion 64B, facilitates movement of the air/oil mixture into passage 89.

As the air/oil mixture circulates around separator 92 toward pump inlet 92D, a velocity is induced out of nozzle 92B to encourage scavenging of gearbox 40 and the centrifugal force generated by the circulating flow tends to separate the oil and air so that most of the air is discharged through hole 92A for venting to bypass duct 54 and the deaerated oil is delivered to scavenge pump inlet 92D. The described leakage airflow is effective to scavenge bearing cavity 82 in any attitude of the engine but is largely ineffective to scavenge gearbox 40 during inverted flight. Scavenging of gearbox 40 during inverted flight is accomplished by gear 104 which rotates in the indicated direction to function as a slinger to force scavenge oil from the gearbox to flow upwardly through passage 106 for delivery to separator 92 through opening 106A. The described system thus provides positive scavenging of both bearing cavity 82 and gearbox 40 in any attitude of the engine and without the use of a separate scavenging pump for inverted flight. The described system, by separating entrained air from the scavenging oil before directing the oil to the scavenge pump inlet, also minimizes the required size of the single scavenge pump. And since the described separator arrangement minimizes the amount of air pumped into the oil storage tank by the scavenge pump, frothing problems in the storage tank are also minimized.

While a preferred embodiment of the invention has been illustrated and described in detail, it should be appreciated that the invention is susceptible of modification without departing from the scope or spirit of the following claims.

I claim:

1. A gas turbine engine comprising
   A. a bearing cavity housing at least one bearing journaling a shaft of the engine;
   B. means delivering lubricating oil to said cavity;
   C. means allowing leakage airflow from a high pressure region of said engine into said cavity;
   D. a scavenge oil pump arranged to deliver scavenge oil to an oil storage tank;
   E. passage means interconnecting said cavity and the inlet of said scavenge oil pump;
   F. vent means in said passage means adjacent the inlet of said pump venting said passage means to a low pressure region of the engine to induce a continuous flow of leakage air from said high pressure region into said cavity and induce a continuous flow of air and entrained scavenge oil through said passage means to the inlet of said pump; and
   G. separator means in said passage means adjacent the inlet of said pump arranged to receive the air and oil mixture flowing through said passage means and operative to separate the oil and air and deliver the oil to the pump inlet and the air to said vent means;
   H. an accessory gearbox positioned at the bottom of the engine housing;
   I. said scavenge pump being driven by said gearbox;

J. said separator means being located in the bottom of said gearbox;
K. the interior of said gearbox communicating with a nozzle which opens in said passage means adjacent the inlet of said separator;
L. the air and oil mixture flowing in said passage means from said cavity being arranged to induce a flow of scavenge oil from said gearbox through said nozzle and into said separator;
M. a plurality of gears journaled in said accessory gearbox; and
N. gearbox passage means extending from a location adjacent the periphery of the topmost gear in said gearbox to said separator;
O. the inlet of the passage means in said gearbox being disposed tangentially with respect to the periphery of said topmost gear so that as said gear rotates during inverted operation of the engine the gear acts as a slinger to force scavenge oil from the gearbox to flow upwardly through said gearbox passage for delivery to said separator.

2. A gas turbine engine comprising
A. a bearing cavity housing at least one bearing journaling a shaft of the engine;
B. means delivering lubricating oil to said cavity;
C. means allowing leakage airflow from a high pressure region of said engine into said cavity;
D. a scavenge oil pump arranged to deliver scavenge oil to an oil storage tank;
E. passage means interconnecting said cavity and the inlet of said scavenge oil pump;
F. vent means in said passage means adjacent the inlet of said pump venting said passage means to a low pressure region of the engine to induce a continuous flow of leakage air from said high pressure region into said cavity and induce a continuous flow of air and entrained scavenge oil through said passage means to the inlet of said pump; and
G. separator means in said passage means adjacent the inlet of said pump arranged to receive the air and oil mixture flowing through said passage means and operative to separate the oil and air and deliver the oil to the pump inlet and the air to said vent means;
H. an accessory gearbox positioned at the bottom of the engine housing;
I. said scavenge pump being driven by and adjacent said gearbox;
J. said separator means being located defined in the bottom of said gearbox;
K. the interior of said gearbox communicating with a nozzle which opens in said passage means adjacent the inlet of said separator;
L. the air and oil mixture flowing in said passage means from said cavity being arranged to induced a flow of scavenge oil from said gearbox through said nozzle and into said separator;
M. an accessory drive shaft extending downwardly from a location adjacent said engine shaft to a location adjacent said accessory gearbox, whereby to drive the gears within said gearbox, and
N. a scroll-shaped cavity at the interface of said gearbox and the engine housing adjacent and surrounding the lower end of said accessory drive shaft;
O. said passage means including an oversized passage extending downwardly from said bearing cavity to said scroll-shaped cavity and another passage extending downwardly from said scroll-shaped cavity to said separator means; and
P. said accessory drive shaft running in said oversized passage but occupying only a portion of the passage cross section so as to permit the free flow of air and entrained oil downwardly through said passage to the scroll-shaped cavity and thence to the separator means.

* * * * *